United States Patent
Zhamu et al.

(10) Patent No.: US 11,572,277 B2
(45) Date of Patent: Feb. 7, 2023

(54) ECO-FRIENDLY PRODUCTION OF GRAPHENE

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 539 days.

(21) Appl. No.: 15/484,546

(22) Filed: Apr. 11, 2017

(65) Prior Publication Data

US 2018/0290890 A1    Oct. 11, 2018

(51) Int. Cl.
*C01B 32/182* (2017.01)
*C01B 32/184* (2017.01)
*B82Y 40/00* (2011.01)

(52) U.S. Cl.
CPC .......... *C01B 32/182* (2017.08); *C01B 32/184* (2017.08); *B82Y 40/00* (2013.01); *C01B 2204/02* (2013.01); *C01B 2204/04* (2013.01); *Y10S 977/734* (2013.01); *Y10S 977/842* (2013.01)

(58) Field of Classification Search
CPC ................ C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01B 32/184; B82Y 40/00; Y10S 977/734; Y10S 977/842
See application file for complete search history.

(56) References Cited

U.S. PATENT DOCUMENTS

| | | | |
|---|---|---|---|
| 3,914,392 A * | 10/1975 | Klett | C04B 35/528 423/445 R |
| 6,872,330 B2 | 3/2005 | Mack et al. | |
| 2006/0216222 A1 | 9/2006 | Jang et al. | |
| 2013/0087446 A1* | 4/2013 | Zhamu | C01B 32/22 204/157.43 |

(Continued)

OTHER PUBLICATIONS

Ye, et al., Converting waste paper to multifunctional graphene-decorated carbon paper: from trash to treasure, J. Mater. Chem. 2015;1 3: 13926-13932 (Year: 2015).*

(Continued)

*Primary Examiner* — Daniel C. McCracken

(57) ABSTRACT

Provided is method of producing graphene directly from a pulp, paper, or paper product, the method comprising a procedure of subjecting the pulp, paper, or paper product (preferably containing post-consumer, reclaimed, or recycled product) to a graphitization treatment at a graphitization temperature in the range of 1,500° C. to 3,400° C. (preferably >2,500° C.) in a substantially non-oxidizing environment for a length of time sufficient for converting the product to a graphene material product. Preferably and typically, the method does not involve the use of an externally added undesirable chemical (other than those paper chemicals already present in the paper product) or catalyst. The method is environmentally benign, ecologically friendly, and highly scalable.

27 Claims, 2 Drawing Sheets

100 nm

(56) References Cited

U.S. PATENT DOCUMENTS

2014/0227162 A1* 8/2014 Joh ..................... B01J 37/0232
                                                          423/448
2015/0133568 A1  5/2015 Zhao et al.
2016/0060123 A1  3/2016 Rashidi et al.

OTHER PUBLICATIONS

Deng, et al., Catalytic graphitization of electrospun cellulose nanofibers using silica nanoparticles, Reactive & Functional Polymers 2014; 85: 235-238 (Year: 2014).*
Poletto et al., Native Cellulose: Structure, Characterization and Thermal Properties, Materials 2014; 7: 6105-6119 (Year: 2014).*
"Pulp and Paper Dictionary," accessed online at https://web.archive.org/web/20170103080018/https://paperonweb.com/dict.htm (Jan. 3, 2017) (Year: 2017).*
"Pulp & Paper Resources & Information Site," accessed online https://web.archive.org/web/20170125223933/https://paperonweb.com/index.htm (Jan. 25, 2017) (Year: 2017).*
Rodriguez-Mirasol et al., High-Temperature Carbons from Kraft Lignin, Carbon 1996; 34(1): 43-52 (Year: 1996).*
Ruan, et al., Growth of Graphene from Food, Insects, and Waste, ACS Nano 2011; 5(9): 7602-7607. (Year: 2011).*
Zhao, et al., Preparation of carbon sphere from corn starch by a simple method, Materials Letters 2008; 62: 3322-3324 (Year: 2008).*
Rutledge, et al., Carbonized Starch Microcellular Foam-Cellulose Fiber Composite Structures, Bioresources 2008; 3(4): 1063-1080 (Year: 2008).*
Yu, et al., Preparation and magnetic behavior of carbon-encapsuolated cobalt and nickel nanoparticles from starch, Chemical Engineering Research and Design 2008; 86: 904-908 (Year: 2008).*
Kim et al., Graphitization of highly crystalline cellulose, Carbon 2001; 1051-1056. (Year: 2001).*
Fitzer, et al., Recommended Terminology For The Description of Carbon As A Solid, Pure & Appl. Chem. 1995; 67(3): 473-506 (Year: 1995).*
Bianco, et al., All in the graphene family—A recommended nomenclature for two-dimensional carbon materials, Carbon 2013; 65: 1-6 (Year: 2013).*
Herring, et al., A Novel Method for the Templated Synthesis of Homogenous Samples of Hollow Carbon Nanospheres from Cellulose Chars, JACS 2003; 125: 9916-9917 (Year: 2003).*
PCT/US18/25113 International Search Report and Written Opinion dated Jul. 9, 2018, 6 pages.
Bor Z. Jang and A Zhamu, "Processing of Nano Graphene Platelets (NGPs) and NGP Nanocomposites: A Review," J. Materials Sci. 43 (2008) 5092-5101.
Yang, et al. "Two-dimensional Graphene Nano-ribbons," J. Am. Chem. Soc. 130 (2008) 4216-17.

* cited by examiner 100 nm

ECO-FRIENDLY PRODUCTION OF GRAPHENE

FIELD OF THE INVENTION

The present invention provides an environmentally benign and eco-friendly method of producing graphene materials. The method entails thermal conversion of paper products (particularly, post-consumer, reclaimed, or recycled paper products) in one step, dramatically shortening the time to produce graphene and avoiding the use of undesirable chemicals.

BACKGROUND

A single-layer graphene sheet is composed of carbon atoms occupying a two-dimensional hexagonal lattice. Multi-layer graphene is a platelet composed of more than one graphene plane of carbon atoms. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, hydrogenated graphene, and chemically functionalized graphene.

Graphene has been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was world's first to discover graphene [B. Z. Jang and W. C. Huang, "Nano-scaled Graphene Plates," U.S. Patent Application US20130087446, published Jun. 10, 2014; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:

Approach 1: Chemical Formation and Reduction of Graphite Oxide (GO) Platelets

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). Prior to intercalation or oxidation, graphite has an inter-graphene plane spacing of approximately 0.335 nm ($L_d = ½ d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this chemical production process:

(1) The process requires the use of large quantities of several undesirable chemicals, such as sulfuric acid, nitric acid, and potassium permanganate or and sodium chlorate.

(2) The chemical treatment process requires a long intercalation and oxidation times, typically 5 hours to five days.

(3) Strong acids consume a significant amount of graphite during this long intercalation/oxidation process by "eating their way into the graphite" (converting graphite into carbon dioxide, which is lost in the process). It is not unusual to lose 20-50% by weight of the graphite material immersed in strong acids and oxidizers.

(4) The thermal exfoliation requires a high temperature (typically 800-1,050° C.) and, hence, is a highly energy-intensive process.

(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present invention was made to address these issues.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. Patent Application No. US20060216222, published Sep. 28, 2006; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Some previous attempts have been made to produce graphene materials from biomass. For instance, B. Zhao, et al. ("Method for Preparing Graphene from Biomass-derived carbonaceous mesophase," US Pub. No. 2015/0133568, May 14, 2015) discloses a method for preparing graphene, which includes (a) preparing a carbonaceous meso-phase from a biomass; (b) soaking a base substance (a catalytic substrate, such as wafer or powdery single crystalline silicon, polycrystalline silicon, mica, or quartz) into an ethanol solution of the biomass-derived carbonaceous mesophase for a period of time; (c) taking out and drying the base substance (which contains a layer of biomass-derived carbonaceous mesophase being attached to the surface of the base substance); (d) subjecting the base substance to a heat treatment (600-1,000° C.) under the protection of a hydrogen atmosphere to form a stacked graphene film on the surface of the base substance; (e) subjecting the base substance to ultrasonic dispersion treatment in an alcohol solvent to separate the graphene film from the base substance to form a graphene alcohol solution; and (f) separating/ recovering graphene from the alcohol solvent solution. It may be noted that the conversion of a biomass to a carbonaceous meso-phase is not a trivial task. It would take some complex catalytic or hydrothermal process to accomplish. Then, there are additional 5 steps to convert carbonaceous meso-phase to graphene.

Additionally, A. Rashidi, et al. ("Producing Graphene and Porous Graphene," US Pub. No. 2016/0060123, Mar. 3, 2016) discloses a multiple-step method for producing nano-porous graphene. This 5-step method includes the step of (a) preparing cellulosic raw materials (e.g. chopped into fine particle sizes); (b) impregnating the prepared raw materials with a catalyst (e.g. Mg, Al, Si, Mo, W, Ni, Cu, Zn, Ti, metal oxides, etc.); (c) activating the catalyst-impregnated cellulosic materials (using undesirable chemicals, such as KOH); (d) heating the activated cellulosic raw materials in a heating system having a final heat treatment temperature of 700-1,100° C. to create nano-porous graphene; and (e) washing the nano-porous graphene to remove impurity. The use of these catalyst materials means the necessity of additional steps to remove them afterward. These steps may not be capable of completely removing these catalysts.

These prior art methods are typically very complex and tedious (requiring many steps) and require the use of externally added substances or undesirable (obnoxious) chemicals that must be removed after graphene is formed. It has not been always possible to completely remove the impurities from the graphene product. In several cases, undesirable or expensive chemicals (e.g. highly corrosive KOH and expensive Ni, Mo, and W) are used. None of these prior art methods or processes begin with paper or paper products, particularly post-consumer, reclaimed or recycled paper or paper products.

Hence, an urgent need exists to have an environmentally benign and eco-friendly graphene production process that requires no undesirable chemical or expensive chemical, shortened process time, lower degree of graphene oxidation, reduced or eliminated effluents of undesirable chemical species into the drainage (e.g., sulfuric acid and nitric acid) or into the air (e.g., $SO_2$ and $NO_2$). The process should be able to produce more pristine (less oxidized and less damaged) and more electrically conductive graphene sheets.

SUMMARY OF THE INVENTION

The present invention provides a strikingly simple, scalable, environmentally benign, eco-friendly, and cost-effective graphene-producing method that meets the aforementioned needs. Specifically provided is a method of producing graphene directly from a pulp, paper, or paper product, the method comprising a procedure of subjecting the pulp, paper, or paper product (preferably containing a post-consumer, reclaimed, or recycled product) to a graphitization treatment at a graphitization temperature selected from the range of 1,500° C. to 3,400° C. in a substantially non-oxidizing environment (oxygen content in the atmosphere surrounding the product being less than 5%, preferably <1%, and further preferably <0.1%) for a length of time sufficient for converting the product to a graphene material product. Preferably, the method does not involve the use of an externally added chemical (other than those paper chemicals already present in the paper product during manufacturing) or any catalyst. The method is environmentally benign, ecologically friendly, and highly scalable.

Again, preferably, the pulp, paper, or paper product contains a post-consumer, reclaimed, or recycled product. This will have a highly positive impact to the environment since paper and paper products constitute a significant proportion of post-consumer solid waste.

Preferably, the graphitization temperature is greater than 2,000° C., more preferably greater than 2,500° C., and most preferably greater than 2,800° C.

The procedure of subjecting the pulp, paper, or paper product to a graphitization treatment may include positioning the pulp, paper, or paper product in a heat treatment chamber (e.g., a graphite crucible) and exposing the product to an initial temperature lower than 1,500° C. (e.g. ambient temperature), which is then increased to a temperature in the range of 1,500° C. to 3,400° C.

In certain preferred embodiments, the procedure of subjecting the pulp, paper, or paper product to a graphitization treatment includes (a) positioning the pulp, paper, or paper product in a heat treatment chamber and exposing the product to a first treatment temperature selected from the range of 200° C. to 600° C. for a first period of time to form a first intermediate product; (b) further heat-treating the first intermediate product at a second temperature selected from the range of 700° C. to 1,500° C. for a second period of time to form a second intermediate product; and (c) subjecting the second intermediate product to a final graphitization treatment at a temperature selected from the range of 2,000° C. to 3,400° C. (more preferably from 2,500° C. to 3,000° C.).

The first period of time is preferably from 0.5 hours to 6 hours. The second period of time is preferably from 0.5 hours to 6 hours. The first treatment at 200° C. to 600° C. (also herein referred to as the first-stage treatment) is preferably conducted in a reactive environment and the second treatment at 700° C. to 1,500° C. (also herein referred to as the second-stage treatment) is conducted in an inert or non-oxidizing environment. The two periods of pre-treatment of the pulp, paper, or paper product prior to the final graphitization treatment, although not required, can be beneficial in terms of increasing the amount of graphene sheets that can be produced given the same amount of feedstock. In the processing conditions wherein the first treatment and the second treatments are substantially skipped (e.g. the temperature ramping procedure does not stay in a particular temperature from 200° C. to 1,500° C. for longer than 0.5 hours), the process is herein referred to as direct graphitization.

In certain preferred embodiments, the feedstock (pulp, paper, or paper product) is conveniently placed into a heat treatment chamber pre-set a temperature that is conducive to loading of the feedstock. The temperature is then slowly ramped up to the desired final temperature (e.g. 2,500° C. to 3,200° C.), maintained at this temperature for 0.5 to 5 hours, and then cooled down to a temperature that enables easy removal of the graphene product.

In certain alternative embodiments, the feedstock (e.g. reclaimed pulp, paper, or paper product) is placed into a heat treatment chamber (e.g. graphite crucible), which is moved (e.g., conveyor-carried) into one end of a heating furnace and, after a desired length of heat treatment time, moves out of the furnace from an opposite end. Typically, the entry zone and the exit zone of the furnace have a lower temperature than the mid-section (graphitization zone) of the furnace. There should be a sufficient length of the graphitization zone to enable the product residence time in this zone for no less than 0.5 hours, preferably from 0.5 to 5 hours (can be longer, as deemed desired).

The heat treatment chamber may be constructed from a high-temperature refractory material selected from graphite, tungsten, tungsten carbide, zirconia, molybdenum oxide, niobium oxide, tantalum, tantalum oxide, or a combination thereof.

Preferably, the provision of a non-oxidizing environment for the graphitization treatment includes the introduction of nitrogen, hydrogen, a noble gas (e.g. Ar gas), or a combination thereof, into the heat treatment chamber. The substantially non-oxidizing environment implies an atmosphere containing less than 5% by weight oxygen, preferably <1%, further preferably <0.1%, and most preferably <0.01%.

In certain preferred embodiments, the pulp, paper, or paper product is packed or compacted into a feedstock prior to being placed into the heat treatment chamber. Preferably, the feedstock (packed or compacted pulp, paper, or paper product) has a bulk density in the range from 0.1 to 1.5 $g/cm^3$, more preferably in the range from 0.2 to 1.2 $g/cm^3$, and most preferably greater than 0.4 $g/cm^3$. This higher feedstock density is desirable not only for packing more feedstock materials into a given heat treatment chamber but also, surprisingly, enable the production of graphene at a much higher production yield (15%-50% vs. 5%-15% yield rate for non-compacted feedstock). The resulting graphene sheets are also larger in lateral dimensions (length or width 50-500 nm vs. 5-50 nm for graphene sheets from non-compacted feedstock). This is truly unexpected and highly beneficial.

The method typically is capable of producing a graphene material product in a powder form containing at least 80% single-layer or few-layer graphene sheets, wherein few-layer graphene is commonly defined as a graphene sheet having 2 to 10 graphene planes stacked together. The method can lead to production of a graphene material product contains at least 90% single-layer or few-layer graphene sheets. In certain embodiments of the invention, the method may further comprise a step of separating or recovering graphene from non-graphene carbon residue in the graphene material product. The carbon residue typically contains amorphous carbon and some minute graphite crystals.

The paper or paper product in the feedstock may contain a material or product selected from a paper base, bond paper, construction paper, containerboard, corrugated container board, chipboard, cover paper, envelope paper, form bond paper, insulating board paper, Kraft bag paper, Kraft wrapping paper, mechanical paper, newsprint paper, napkin stock, offset paper, packaging paper, paperboard, printing-writing paper, fine paper, coarse paper, recycled paper, solid bleached bristols, specialty paper, tissue paper, or a combination thereof. The pulp may be selected from chemical pulp, brown pulp, dissolving pulp, fluff pulp, Kraft (sulfate) pulp, market pulp, mechanical pulp, sulfite pulp, unbleached pulp, or a combination thereof.

The invention also provides a method of producing graphene directly from a wood product or wood ingredient (not including the paper or paper product obtained from wood). This environmentally benign method comprises a procedure of subjecting the wood product or wood ingredient to a graphitization treatment at a graphitization temperature in the range of 1,500° C. to 3,400° C. in a substantially non-oxidizing environment for a length of time sufficient for converting the product to a graphene material product, wherein the method does not involve the use of a catalyst. Additionally, the method also does not use any undesirable or hazardous chemical. The graphitization temperature is preferably greater than 2,000° C., further preferably greater than 2,500° C., and most preferably greater than 2,800° C. The non-oxidizing environment for graphitization includes nitrogen, hydrogen, a noble gas, or a combination thereof.

The wood ingredient is selected from native cellulose, purified cotton, regenerated cellulose or Rayon, β-cellulose, γ-cellulose, nitro cellulose, hemicellulose, lignin, an wood extractive, a cellulose derivative, rosin, alum, starch, a combination thereof, or a combination thereof with wood pulp.

The cellulose derivative is selected from cellulose acetate, cellulose triacetate, cellulose propionate, cellulose acetate propionate (CAP), cellulose acetate butyrate (CAB), nitrocellulose (cellulose nitrate), cellulose sulfate, alkyl cellulose (e.g. methylcellulose, ethyl cellulose, ethyl methyl cellulose), hydroxyalkyl cellulose (e.g. hydroxyethyl cellulose, hydroxypropyl cellulose (HPC), hydroxyethyl methyl cellulose, hydroxypropyl methyl cellulose (HPMC), ethyl hydroxyethyl cellulose), and carboxyalkyl cellulose (e.g. Carboxymethyl cellulose (CMC)).

The procedure of subjecting the wood product or wood ingredient to a graphitization treatment includes positioning the wood product or wood ingredient in a heat treatment chamber and exposing the wood product or wood ingredient to an initial temperature lower than 1,500° C., which is then increased to a graphitization temperature in the range of 1,500° C. to 3,400° C.

In certain preferred embodiments, the procedure of subjecting the wood product or wood ingredient to a graphitization treatment includes (a) positioning wood product or wood ingredient in a heat treatment chamber and exposing the product to a first treatment temperature selected from the range of 200° C. to 600° C. for a first period of time to form a first intermediate product; (b) further heat-treating the intermediate product at a second temperature selected from the range of 700° C. to 1,500° C. for a second period of time to form a second intermediate product; and (c) subjecting the second intermediate product to a final graphitization treatment at a temperature selected from the range of 2,000° C. to 3,200° C. (more preferably from 2,500° C. to 3,000° C.).

The first period of time is preferably from 0.5 hours to 6 hours. The second period of time is preferably from 0.5 hours to 6 hours. The first treatment at 200° C. to 600° C. is preferably conducted in a reactive environment and the second treatment at 700° C. to 1,500° C. is conducted in an inert or non-oxidizing environment. The two periods of pre-treatment of the wood product or wood ingredient prior to the final graphitization treatment, although not required, can be beneficial in increasing the amount of graphene sheets that can be produced given the same amount of feedstock.

The graphene material product produced is typically in a powder form containing at least 80% single-layer or few-layer graphene sheets, wherein few-layer graphene is defined as a graphene sheet having 2 to 10 graphene planes stacked together. Typically, the graphene material product contains at least 90% single-layer or few-layer graphene sheets.

DETAILED DESCRIPTION OF PREFERRED EMBODIMENTS

Figure 1:
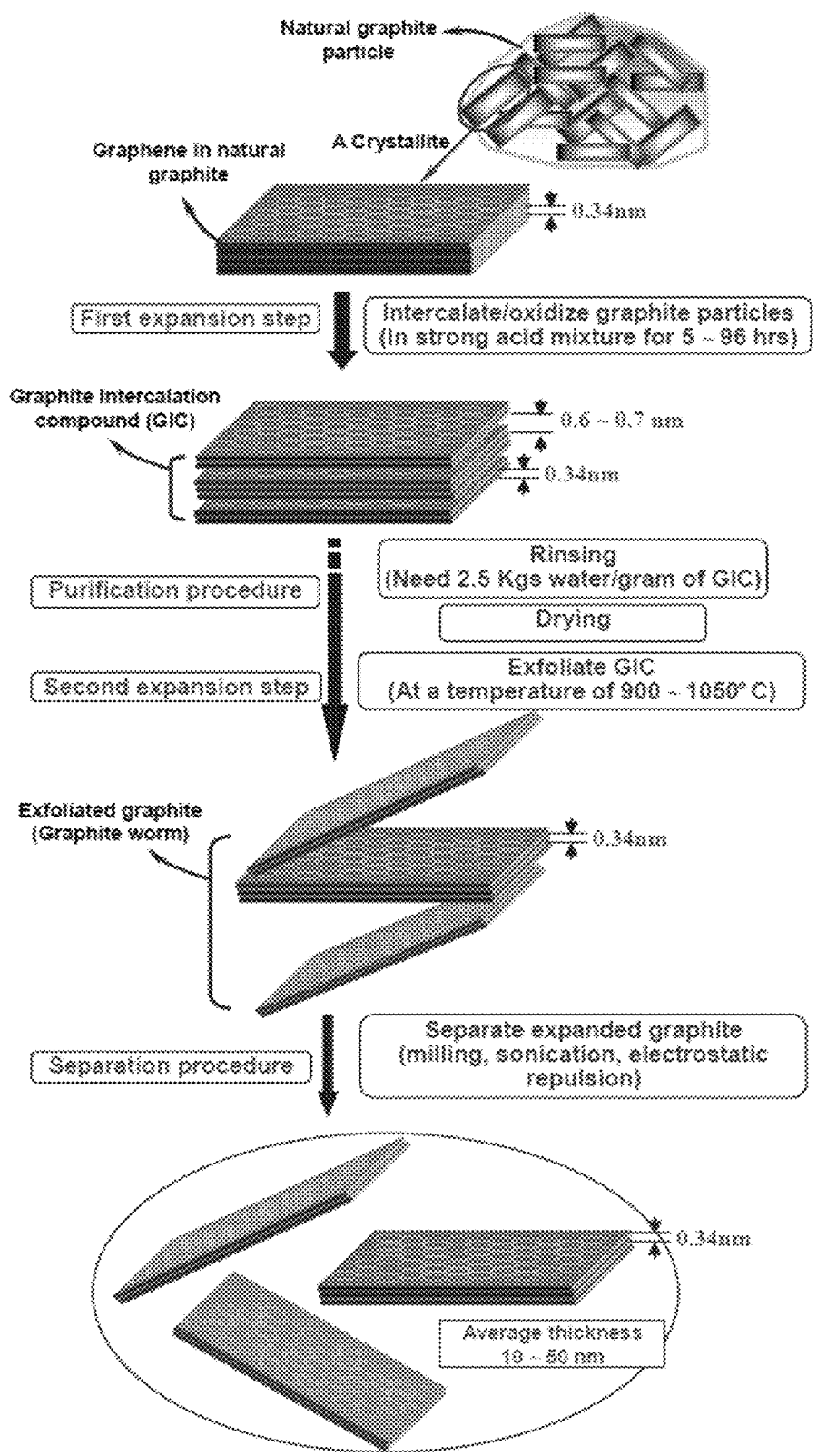
FIG. 1 A flow chart showing the most commonly used prior art process of producing highly oxidized NGPs that entails tedious chemical oxidation/intercalation, rinsing, and high-temperature exfoliation procedures.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene sheets or basal planes that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, carbon/graphite whisker, or carbon/graphite nano-fiber, etc.

One preferred specific embodiment of the present invention is a method of producing a graphene material (also referred to as nano graphene platelet, NGP) that is essentially composed of a sheet of graphene plane or multiple sheets of graphene plane stacked and bonded together (typically, on an average, up to five sheets per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphite plane. By definition, the thickness of an NGP is 100 nanometers (nm) or smaller, with a single-layer graphene being as thin as 0.34 nm. However, the presently invented method produces graphene sheets that are typically from 1 to 10 layers (or from 0.34 nm to 3.4 nm in thickness) and more typically from 1 to 5 layers. In many cases, the graphene materials produced are mostly single-layer graphene (typically >80% and more typically >90%). The length and width of a NGP are typically between 5 nm and more typically between 10 nm and 500 nm.

The present invention provides a method of producing graphene directly from a pulp, paper, or paper product. The method comprises a procedure of subjecting the pulp, paper, or paper product (preferably containing post-consumer, reclaimed, or recycled products) to a graphitization treatment at a graphitization temperature selected from the range of 1,500° C. to 3,400° C. in a substantially non-oxidizing environment for a length of time sufficient for converting the product to a graphene material product, wherein the method does not involve the use of an externally added chemical (other than those paper chemicals already present in the paper product during manufacturing) or any catalyst. The substantially non-oxidizing environment contains an oxygen content in the atmosphere surrounding the product being less than 5%, preferably <1%, further preferably <0.1%, and most preferably <0.01%.

Preferably, the pulp, paper, or paper product contains a post-consumer, reclaimed, or recycled product. This has a highly positive impact to the environment since paper and paper products constitute a significant proportion of post-consumer solid waste, which would otherwise get buried underground.

The invented method is essentially a single-step process. The method is strikingly simple, scalable, environmentally benign, eco-friendly, and cost-effective. The method avoids essentially all of the drawbacks associated with prior art processes.

In contrast, as shown in FIG. 1, the prior art chemical processes typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This is typically accomplished by exposing the GIC to a furnace pre-set at a temperature of typically 800-1100° C. (more typically 950-1050° C.). The prior art processes suffer from the seven (7) major problems described in the Background section.

In certain embodiments of the present invention, the procedure of subjecting the pulp, paper, or paper product to a graphitization treatment may include positioning the pulp, paper, or paper product in a heat treatment chamber (e.g., a graphite crucible) and exposing the product to an initial temperature lower than 1,500° C. (e.g. ambient temperature), which is then increased to a temperature in the range of 1,500° C. to 3,400° C. Preferably, the graphitization temperature is greater than 2,000° C., more preferably greater than 2,500° C., and most preferably greater than 2,800° C.

The feedstock (pulp, paper, or paper product) may be placed into a heat treatment chamber pre-set a temperature that is not too high so that loading of the feedstock would not become problematic. The temperature is then slowly ramped up to the desired final temperature (e.g. 2,500° C. to 3,200° C.), maintained at this temperature for 0.5 to 5 hours, and then cooled down to a temperature that enables easy removal of the graphene material product.

In certain alternative embodiments, the feedstock (e.g. reclaimed pulp, paper, or paper product) is placed into a heat treatment chamber (e.g. graphite crucible), which is moved (e.g., conveyor-carried) into one end of a heating furnace and, after a desired length of heat treatment time, moves out of the furnace from an opposite end. Typically, the entry zone and the exit zone of the furnace have a lower temperature than the mid-section (graphitization zone) of the furnace. There should be a sufficient length of the graphitization zone to enable the product residence time in this zone for no less than 0.5 hours, preferably from 0.5 to 5 hours (can be longer, as deemed desired).

In certain preferred embodiments, the procedure of subjecting the pulp, paper, or paper product to a graphitization treatment includes (a) positioning the pulp, paper, or paper product in a heat treatment chamber and exposing the product to a first treatment temperature selected from the range of 200° C. to 600° C. (also herein referred to as the first-stage treatment) for a first period of time to form a first intermediate product; (b) further heat-treating the first intermediate product at a second temperature selected from the range of 700° C. to 1,500° C. (also herein referred to as the second-stage treatment) for a second period of time to form a second intermediate product; and (c) subjecting the second intermediate product to a final graphitization treatment at a temperature selected from the range of 2,000° C. to 3,200° C. (more preferably from 2,500° C. to 3,000° C.).

Preferably, the first period of time is from 0.5 hours to 6 hours, preferably in a reactive environment (e.g. with flowing air, oxygen, chlorine, or HCl gas). The second period of time is also preferably from 0.5 hours to 6 hours, but under an inert or non-oxidizing atmosphere. The graphitization must be conducted in an inert or non-oxidizing atmosphere.

The two periods of pre-treatment of the pulp, paper, or paper product prior to the final graphitization treatment, although not required, can be beneficial in increasing the amount of graphene sheets that can be produced given the same amount of feedstock. The reasons for these improvements are not totally clear. However, the applicant believes that a first period of heat treatment at 200° C. to 600° C. at a relatively low heating rate can favor controlled decomposition of the cellulose structure in such a manner that it promotes aromatization and development of incipient graphene layers (graphene-like aromatic or fused-ring structures or domains). More aromatic fused rings or graphene-like layers will be nucleated and grow during the second period of heat treatment at 700° C. to 1,500° C. During graphitization, graphene planes from neighboring graphene-like domains are merged to form longer or wider graphene sheets.

The heat treatment chamber may be constructed from a high-temperature refractory material selected from graphite, tungsten, tungsten carbide, zirconia, molybdenum oxide, niobium oxide, tantalum, tantalum oxide, or a combination thereof.

Preferably, the provision of a non-oxidizing environment includes the introduction of nitrogen, hydrogen, a noble gas (e.g. Ar gas), or a combination thereof, into the heat treatment chamber. The substantially non-oxidizing environment implies an atmosphere containing less than 5% by weight oxygen, preferably <1%, further preferably <0.1%, and most preferably <0.01%.

In certain preferred embodiments, the pulp, paper, or paper product is packed or compacted (with or without using a binder resin) into a feedstock prior to being placed into the heat treatment chamber. Preferably, the feedstock (packed or compacted mass of pulp, paper, or paper product) has a bulk density in the range from 0.1 to 1.5 g/cm$^3$, more preferably in the range from 0.2 to 1.2 g/cm$^3$, and most preferably greater than 0.4 g/cm$^3$. This higher feedstock density is desirable not only for packing more feedstock materials into a given heat treatment chamber but also, surprisingly, enable the production of graphene at a much higher production yield (typically 15%-50% vs. 5%-15% yield rate for non-compacted feedstock). The resulting graphene sheets are also larger in lateral dimensions (length or width 50-500 nm vs. 5-50 nm for graphene sheets from non-compacted feedstock). This is truly unexpected and highly beneficial.

The feedstock may contain a desired amount of a carbonization promoter (protecting against excessive evolution of volatile gas molecules from uncontrolled decomposition of the constituent cellulose molecules) and/or flame retardant that is mixed with the pulp, paper, or paper product. The carbon yield and graphene production yield can be significantly enhanced by impregnating or incorporating a carbonization promoter and/or flame retardant, which may be preferably selected from the group consisting of nitrogenous salts of acids, acids, acid salts, metal halides, derivatives of phosphoric acid, chlorosilanes, and combinations thereof.

The method typically is capable of producing a graphene material product in a powder form containing at least 80% single-layer or few-layer graphene sheets, wherein few-layer graphene is commonly defined as a graphene sheet having 2 to 10 graphene planes stacked together. The method can lead to production of a graphene material product contains at least 90% single-layer or few-layer graphene sheets (in many cases, >90% of graphene sheets being single-layer). In certain embodiments of the invention, the method may further comprise a step of separating or recovering graphene from non-graphene carbon residue in the graphene material product. The carbon residue typically contains amorphous graphene and some minute graphite crystals.

The paper or paper product in the feedstock may contain a material or product selected from a paper base, bond paper, construction paper, containerboard, corrugated container board, chipboard, cover paper, envelope paper, form bond paper, insulating board paper, Kraft bag paper, Kraft wrapping paper, mechanical paper, newsprint paper, napkin stock, offset paper, packaging paper, paperboard, printing-writing paper, fine paper, coarse paper, recycled paper, solid bleached bristols, specialty paper, tissue paper, or a combination thereof. The pulp may be selected from chemical pulp, brown pulp, dissolving pulp, fluff pulp, Kraft (sulfate) pulp, market pulp, mechanical pulp, sulfite pulp, unbleached pulp, or a combination thereof.

The invention also provides a method of producing graphene directly from a wood product or wood ingredient (not including paper or paper product produced from wood). This environmentally benign method comprises a procedure of subjecting the wood product or wood ingredient to a graphitization treatment at a graphitization temperature in the range of 1,500° C. to 3,400° C. in a substantially non-oxidizing environment for a length of time sufficient for converting the product to a graphene material product, wherein the method does not involve the use of a catalyst. Preferably, the method also does not use any undesirable or hazardous chemical. The graphitization temperature is preferably greater than 2,000° C., further preferably greater than 2,500° C., most preferably greater than 2,800° C.

The wood ingredient is selected from native cellulose, purified cotton, regenerated cellulose or Rayon, β-cellulose, γ-cellulose, nitro cellulose, hemicellulose, lignin, an wood extractive, a cellulose derivative, rosin, alum, starch, a combination thereof, or a combination thereof with wood pulp.

The cellulose derivative is selected from cellulose acetate, cellulose triacetate, cellulose propionate, cellulose acetate propionate (CAP), cellulose acetate butyrate (CAB), nitrocellulose (cellulose nitrate), cellulose sulfate, alkyl cellulose (e.g. methylcellulose, ethyl cellulose, ethyl methyl cellulose), hydroxyalkyl cellulose (e.g. hydroxyethyl cellulose, hydroxypropyl cellulose (HPC), hydroxyethyl methyl cellulose, hydroxypropyl methyl cellulose (HPMC), ethyl hydroxyethyl cellulose), and carboxyalkyl cellulose (e.g. Carboxymethyl cellulose (CMC)).

The procedure of subjecting the wood product or wood ingredient to a graphitization treatment includes positioning the wood product or wood ingredient in a heat treatment chamber and exposing the wood product or wood ingredient to an initial temperature lower than 1,500° C., which is then increased to a graphitization temperature in the range of 1,500° C. to 3,400° C. The non-oxidizing environment includes nitrogen, hydrogen, a noble gas, or a combination thereof.

The procedure of subjecting the wood product or wood ingredient to a graphitization treatment may include positioning the wood product or wood ingredient in a heat treatment chamber and exposing the wood product or wood ingredient to an initial temperature lower than 1,500° C., which is then increased to a graphitization temperature in the range of 1,500° C. to 3,400° C.

In certain preferred embodiments, the procedure of subjecting the wood product or wood ingredient to a graphitization treatment includes (a) positioning the wood product or wood ingredient in a heat treatment chamber and exposing the product to a first treatment temperature selected from the range of 200° C. to 600° C. for a first period of time to form a first intermediate product; (b) further heat-treating the intermediate product at a second temperature selected from the range of 700° C. to 1,500° C. for a second period of time to form a second intermediate product; and (c) subjecting the second intermediate product to a final graphitization treatment at a temperature selected from the range of 2,000° C. to 3,200° C. (more preferably from 2,500° C. to 3,000° C.).

The first period of time is preferably from 0.5 hours to 6 hours. The second period of time is preferably from 0.5 hours to 6 hours. The first treatment at 200° C. to 500° C. is preferably conducted in a reactive environment and the second treatment at 700° C. to 1,500° C. is conducted in an inert or non-oxidizing environment. The two periods of pre-treatment of the wood product or wood ingredient prior to the final graphitization treatment, although not required, can be beneficial in increasing the amount of graphene sheets that can be produced given the same amount of feedstock.

In certain preferred embodiments, the wood product or wood ingredient is mixed with a carbonization promoter or flame retardant selected from the group consisting of nitrogenous salts of acids, acids, acid salts, metal halides, derivatives of phosphoric acid, chlorosilanes, and combinations thereof, prior to being heat treated. These additives were found to increase the production yield of graphene.

The graphene material product produced is typically in a powder form containing at least 80% single-layer or few-layer graphene sheets, wherein few-layer graphene is defined as a graphene sheet having 2 to 10 graphene planes stacked together. Typically, the graphene material product contains at least 90% single-layer or few-layer graphene sheets.

The graphitization treatment products of pulp, paper, paper product, wood product, or wood ingredient can be in a powder form. In some cases, the products can mimic the original shape of the feedstock, but the products contain graphene sheets. In these cases, the graphitization treatment step may be followed by a step of subjecting the product to a mechanical shearing treatment to produce a graphene material product in a powder form. The mechanical shearing treatment comprises using air milling, air jet milling, ball milling, rotating-blade mechanical shearing, ultrasonication, cavitation, or a combination thereof.

The following examples serve to provide the best modes of practice for the present invention and should not be construed as limiting the scope of the invention:

Example 1: Controlled Graphitization Treatments of Pulp, Paper and Paper Products A broad array of pulp, paper, and paper products were subjected to graphitization treatments, with or without the two-stage pre-treatments and with or without the incorporation of a carbonization promoter or flame-retardant additive. The compaction of products was conducted by using a hydraulic press, commonly known as a compression-molding machine. Other compaction procedures, well-known in the art, may also be used. The compressive force is implemented to compact the pulp, paper, or paper product to the extent that it has a bulk density in the range from 0.1 to 1.5 g/cm$^3$, preferably density in the range from 0.2 to 1.2 g/cm$^3$, and more preferably greater than 0.3 g/cm$^3$. The processing conditions and the graphene production yield data (based on total feedstock weight) are summarized in Table 1 below:

TABLE 1

Production of graphene materials different paper products.

| Sample No. | Feedstock material | 1st and 2nd stage treatments | Graphitization treatment | Graphene yield |
|---|---|---|---|---|
| PS-1 | Post-consumer shopping bag paper, compacted | None | Ramped to 2,800° C. in 2 hrs, staying for 2 hrs | 21.5% |
| PS-2 | Post-consumer shopping bag paper, loosely packed | None | Ramped to 2,800° C. in 2 hrs, staying for 2 hrs | 8.4% |
| PS-3 | Post-consumer shopping bag paper, compacted | 200-300° C. for 2 hrs in air; 1,200° C. for 2 hrs in argon | Staying at 2,800° C. for 2 hrs | 28.4% |
| PS-4 | Post-consumer shopping bag paper, loosely packed | 200-300° C. for 2 hrs in air; 1,200° C. for 2 hrs in argon | Staying at 2,800° C. for 2 hrs | 12.6% |
| PS-5 | Post-consumer shopping bag paper, compacted, phosphoric acid added | None | Ramped to 2,800° C. in 2 hrs, staying for 2 hrs | 31.4% |
| PWP-1 | Wood pulp, dried and compacted, sodium acetate added | 300° C. for 2 hrs in air; 1,100° C. for 2 hrs in argon | Staying at 2,800° C. for 2 hrs | 37.7% |
| PB-1 | Shipping box cardboard, compacted | None | Ramped to 3,050° C. in 3 hrs, staying for 1 hr | 24.5% |
| PB-2 | Shipping box cardboard, cut in pieces, loosely packed | None | Ramped to 3,050° C. in 3 hrs, staying for 1 hr | 11.3% |
| PB-3 | Shipping box cardboard, soaked in phosphoric sodium solution, compacted | 250° C. for 2 hrs in HCl vapor; 900° C. for 2 hrs in argon | Staying at 3,050° C. for 1 hr. | 41% |
| PB-4 | Shipping box cardboard, compacted | 250° C. for 2 hrs in HCl vapor; 900° C. for 2 hrs in argon | Staying at 3,050° C. for 1 hr. | 32.3% |
| PC-1 | Office copy paper, compacted, phosphoric acid added | 250° C. for 2 hrs in air; 1,000° C. for 2 hrs in argon | Staying at 2,600° C. for 2 hrs | 31.2% |
| PC-2 | Office copy paper, compacted, phosphoric acid added | None | Ramped to 2,600° C. in 3 hrs, staying for 5 hr | 27.6% |
| PC-3 | Office copy paper, compacted | None | Ramped to 2,600° C. in 3 hrs, staying for 5 hr | 22.1% |
| PN-1 | Newspaper, compacted | 250° C. for 2 hrs in air; 900° C. for 2 hrs in argon | Staying at 1,550° C. for 10 hr. | 16.7% |
| PN-2 | Newspaper, compacted, phosphoric acid added | 250° C. for 2 hrs in air; 900° C. for 2 hrs in argon | Staying at 1,550° C. for 10 hr. | 24.4% |

Figure 2:
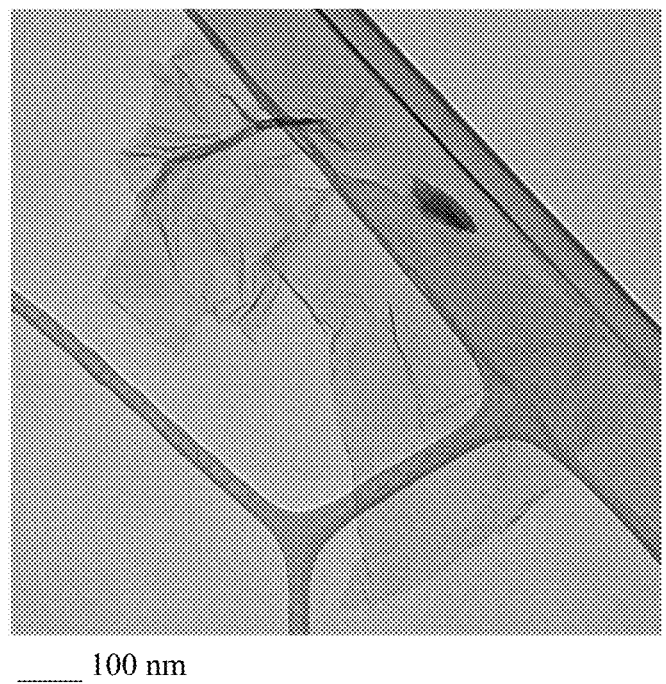
FIG. 2 A TEM image of graphene sheets produced from post-consumer paperboard.

The TEM image of a representative graphene material herein produced is shown in FIG. 2.

Comparative Example 1: Graphene Sheets (NGPs) from Oxidation/Intercalation of Graphite As an example, 20 mg of meso-phase pitch-derived artificial graphite of approximately 20 μm in size were used in the preparation of GO/GIC. Artificial graphite was dispersed in a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exfoliated in a tube furnace at 900° C. for 45 seconds.

The graphene sheets obtained in each sample were examined using atomic force microscopy (AFM), transmission electron microscopy (TEM), and scanning electron microscopy (SEM) to determine their thickness (number of layers) and lateral dimensions (length and width). The graphene sheets suspended in water were cast onto a glass plate to form a thin film (2-5 μm thick) from each sample. The electrical conductivity of the thin film was measured using the four-point probe method. The experimental data indicate that the electrical conductivity of the graphene oxide film (after chemical reduction) is in the range of 30-300 S/cm. In contrast, the electrical conductivity of the graphene films produced according to the instant method is typically in the range of 500-4,500 S/cm.

These data have clearly demonstrated the superiority of the presently invented direct graphitization method of producing graphene materials over conventional chemical methods of using oxidation/intercalation of graphite. Both methods are capable of producing single-layer graphene, but our presently invented method produces graphene sheets that are typically much more electrically conducting. The conventional Hummer's method and all other chemical oxidation/intercalation method necessarily involve highly oxidizing the graphitic material, creating damage (defects) to the resulting graphene sheets that could never be repaired or recovered. Even after heavy chemical reduction with hydrazine, the graphene material (a reduced graphene oxide) still exhibits an electrical conductivity one order of magnitude lower than that of the more pristine graphene produced by the present direct graphitization method.

A wide variety of wood products and wood ingredients were also converted into graphene sheets using the presently invented method. The results are summarized in Table 2 below.

TABLE 2

Production of graphene materials from different wood products or wood ingredients.

| Sample No. | Feedstock material | $1^{st}$ and $2^{nd}$ stage treatments | Graphitization treatment | Graphene yield |
|---|---|---|---|---|
| WS-1 | Wood saw dust, compacted | None | Ramped to 2,800° C. in 2 hrs, staying for 2 hrs | 20.4% |
| WS-2 | Wood saw dust + 5% phosphoric acid, compacted | None | Ramped to 2,800° C. in 2 hrs, staying for 2 hrs | 34.6% |
| WS-3 | Wood saw dust, compacted | 200-300° C. for 2 hrs in air; 1,200° C. for 2 hrs in argon | Staying at 2,800° C. for 2 hrs | 24.5% |
| WS-4 | Wood saw dust + 5% phosphoric acid, compacted | 200-300° C., 2 hrs in air; 1,200° C., 2 hrs in argon | Staying at 2,800° C. for 2 hrs | 36.6% |
| WS-5 | Wood saw dust + phenolic resin binder | None | Ramped to 2,800° C. in 2 hrs, staying for 2 hrs | 38.7% |
| WP-1 | Wood pulp + wood saw dust, compacted, sodium acetate added | 300° C. for 2 hrs in air; 1,100° C., 2 hrs in argon | Staying at 2,800° C. for 2 hrs | 36.2% |
| WP-2 | Wood pulp + wood saw dust, compacted | 300° C. for 2 hrs in air; 1,100° C., 2 hrs in argon | Staying at 2,800° C. for 2 hrs | 28.5% |
| CA-1 | Cellulose acetate | None | Ramped to 3,050° C. in 3 hrs, staying for 1 hr | 34.4% |
| CA-2 | Cellulose acetate + polyimide binder | None | Ramped to 3,050° C. in 3 hrs, staying for 1 hr | 41.3% |
| EC-1 | Ethyl cellulose | 250° C., 2 h HCl vapor; 900° C., 2 hrs in argon | Staying at 3,050° C. for 1 hr. | 41% |
| RC-1 | regenerated cellulose | 250° C., 2 h HCl vapor; 900° C., 2 hrs in argon | Staying at 3,050° C. for 1 hr. | 52.3% |
| HC-1 | Hydroxyethyl cellulose | 250° C., 2 hrs in air; 1,000° C., 2 hrs in argon | Staying at 2,600° C. for 2 hrs | 31.2% |
| WH-1 | Hemicellulose | None | Ramped to 2,600° C. in 3 hrs, staying for 5 hr | 24.6% |
| WH-2 | Hemicellulose + regenerated cellulose | None | Ramped to 2,600° C. in 3 hrs, staying for 5 hr | 38.8% |
| WH-3 | Hemicellulose | 250° C., 2 hrs in air; 900° C., 2 hrs in argon | Staying at 1,550° C. for 10 hr. | 28.5% |
| WL-1 | Lignin | 250° C. for 2 hrs in air; 900° C., 2 hrs in argon | Staying at 2,550° C. for 10 hr. | 18.4% |
| WL-2 | Lignin + regenerated cellulose + (50/50) | 250° C. for 2 hrs in air; 900° C., 2 hrs in argon | Staying at 2,550° C. for 10 hr. | 29.3% |

In summary, the present invention provides an environmentally benign, eco-friendly, highly scalable, and potentially low cost method that can convert the discarded paper or wood products into highly value-added products—graphene. This method shall have a positive and significant impact to society and environment.

The invention claimed is:

1. A method of producing graphene from a pulp, said method comprising a procedure of subjecting said pulp to a graphitization treatment at a graphitization temperature in the range of 1,500° C. to 3,400° C. in a substantially non-oxidizing environment for a length of time sufficient for forming a graphene material product, wherein said pulp is selected from brown pulp, dissolving pulp, fluff pulp, market pulp, mechanical pulp, unbleached pulp, or a combination thereof, wherein said pulp is mixed with a carbonization promoter or flame retardant selected from the group consisting of nitrogenous salts of acids, acid salts, derivatives of phosphoric acid, chlorosilanes, and combinations thereof, prior to being heat treated.

2. The method of claim 1, wherein said pulp contains a post-consumer, reclaimed, or recycled product.

3. The method of claim 1, wherein said graphitization temperature is greater than 2,000° C.

4. The method of claim 1, wherein said graphitization temperature is greater than 2,500° C.

5. The method of claim 1, wherein said graphitization temperature is greater than 2,800° C.

6. The method of claim 1, wherein said procedure of subjecting said pulp to a graphitization treatment includes (a) positioning said pulp in a heat treatment chamber and exposing said product to a first treatment temperature selected from the range of 200° C. to 500° C. for a first period of time to form a first intermediate product; (b) further heat-treating the first intermediate product at a second temperature selected from the range of 700° C. to 1,500° C. for a second period of time to form a second intermediate product; and (c) subjecting said second intermediate product to a final graphitization treatment at a temperature selected from the range of 2,000° C. to 3,400° C.

7. The method of claim 1, wherein said heat treatment chamber has a structure being composed of a high-temperature refractory material selected from graphite, tungsten, tungsten carbide, zirconia, molybdenum oxide, niobium oxide, tantalum, tantalum oxide, or a combination thereof.

8. The method of claim 1, wherein said non-oxidizing environment includes nitrogen, hydrogen, a noble gas, or a combination thereof.

9. The method of claim 1, wherein said graphene material product is in a powder form containing at least 80% single-layer or few-layer graphene sheets, wherein few-layer graphene is defined as a graphene sheet having 2 to 10 graphene planes stacked together.

10. The method of claim 1, wherein said graphene material product contains at least 90% single-layer or few-layer graphene sheets.

11. The method of claim 1, further comprising a step of separating or recovering graphene from non-graphene carbon residue in said graphene material product.

12. The method of claim 1, wherein said graphene material contains at least 90% single-layer or few-layer graphene sheets.

13. The method of claim 1, wherein said procedure of subjecting said pulp to a graphitization treatment includes positioning said pulp in a heat treatment chamber and exposing said pulp to an initial temperature lower than 1,500° C., which is then increased to a temperature in the range of 1,500° C. to 3,400° C.

14. The method of claim 13, wherein said pulp is packed or compacted into a feedstock prior to being placed into said heat treatment chamber.

15. The method of claim 14, wherein said packed or compacted pulp has a bulk density in the range from 0.1 to 1.5 g/cm$^3$.

16. The method of claim 14, wherein said packed or compacted pulp has a bulk density in the range from 0.2 to 1.2 g/cm$^3$.

17. A method of producing graphene from a wood product or wood ingredient, not including a paper or paper product obtained from wood, said method comprising a procedure of subjecting said wood product or wood ingredient to a graphitization treatment at a graphitization temperature in the range of 1,500° C. to 3,400° C. in a substantially non-oxidizing environment for a length of time sufficient for converting said product to a graphene material product, wherein said wood ingredient is selected from purified cotton, an wood extractive, a cellulose derivative, rosin, alum, a combination thereof, or a combination thereof with wood pulp, wherein said cellulose derivative is selected from cellulose triacetate, cellulose propionate, cellulose acetate propionate (CAP), cellulose acetate butyrate (CAB), nitrocellulose (cellulose nitrate), cellulose sulfate, alkyl cellulose, hydroxyalkyl cellulose, hydroxyethyl cellulose, hydroxypropyl cellulose (HPC), hydroxyethyl methyl cellulose, hydroxypropyl methyl cellulose (HPMC), ethyl hydroxyethyl cellulose, carboxyalkyl cellulose, or a combination thereof.

18. The method of claim 17, wherein said graphitization temperature is greater than 2,500° C.

19. The method of claim 17, wherein said graphitization temperature is greater than 2,800° C.

20. The method of claim 17, wherein said procedure of subjecting said wood product or wood ingredient to a graphitization treatment includes positioning said wood product or wood ingredient in a heat treatment chamber and exposing said wood product or wood ingredient to an initial temperature lower than 1,500° C., which is then increased to a temperature in the range of 1,500° C. to 3,400° C.

21. The method of claim 17, wherein said procedure of subjecting said wood product or wood ingredient to a graphitization treatment includes positioning said wood product or wood ingredient in a heat treatment chamber and exposing said wood product or wood ingredient to an initial temperature lower than 1,500° C., which is then increased to a temperature in the range of 1,500° C. to 3,200° C.

22. The method of claim 17, wherein said non-oxidizing environment includes nitrogen, hydrogen, a noble gas, or a combination thereof.

23. The method of claim 17, wherein said wood product or wood ingredient is mixed with a carbonization promoter or flame retardant selected from the group consisting of nitrogenous salts of acids, acids, acid salts, metal halides, derivatives of phosphoric acid, chlorosilanes, and combinations thereof, prior to being heat treated.

24. The method of claim 17, wherein said graphene material is in a powder form containing at least 80% single-layer or few-layer graphene sheets, wherein few-layer graphene is defined as a graphene sheet having 2 to 10 graphene planes stacked together.

25. The method of claim 17, wherein said procedure of subjecting said wood product or wood ingredient to a graphitization treatment includes (a) positioning said wood product or wood ingredient in a heat treatment chamber and exposing said product to a first treatment temperature selected from the range of 200° C. to 500° C. for a first period of time to form a first intermediate product; (b) further heat-treating the first intermediate product at a second temperature selected from the range of 700° C. to 1,500° C. for a second period of time to form a second intermediate product; and (c) subjecting said second intermediate product to a final graphitization treatment at a graphitization temperature selected from the range of 2,000° C. to 3,200° C.

26. The method of claim 25, wherein said first treatment at 200° C. to 500° C. is conducted in a reactive environment and said second treatment at 700° C. to 1,500° C. is conducted in an inert or non-oxidizing environment.

27. A method of producing graphene from a pulp, paper, or paper product, said method comprising a procedure of subjecting said pulp, paper, or paper product to a graphitization treatment at a graphitization temperature in the range of 1,500° C. to 3,400° C. in a substantially non-oxidizing environment for a length of time sufficient for forming a graphene material product, wherein the pulp, paper, or paper product is mixed with a carbonization promoter or flame retardant selected from the group consisting of nitrogenous salts of acids, acid salts, metal halides, derivatives of phosphoric acid, chlorosilanes, and combinations thereof, prior to being heat treated.

* * * * *